(12) United States Patent
Kim et al.

(10) Patent No.: US 7,362,395 B2
(45) Date of Patent: Apr. 22, 2008

(54) DRIVING CIRCUIT BUILT-IN LIQUID CRYSTAL DISPLAY PANEL AND FABRICATING METHOD THEREOF

(75) Inventors: Binn Kim, Seoul (KR); Soo Young Yoon, Gyeonggi-do (KR); Min Doo Chun, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 515 days.

(21) Appl. No.: 11/139,602

(22) Filed: May 31, 2005

(65) Prior Publication Data
US 2005/0264724 A1 Dec. 1, 2005

(30) Foreign Application Priority Data
May 31, 2004 (KR) .................. 10-2004-0039135

(51) Int. Cl.
*G02F 1/1333* (2006.01)
*G02F 1/1345* (2006.01)
*G09G 3/30* (2006.01)

(52) U.S. Cl. .................. 349/110; 349/149; 349/151; 345/80

(58) Field of Classification Search ........ 349/110–111, 349/149, 151; 345/80
See application file for complete search history.

(56) References Cited

U.S. PATENT DOCUMENTS

| 5,781,261 | A  | * | 7/1998  | Ohta et al. ............... 349/111 |
| 6,982,779 | B2 | * | 1/2006  | Park et al ................. 349/153 |
| 7,202,116 | B2 | * | 4/2007  | Chang et al. ............. 438/149 |
| 2003/0038913 | A1 | * | 2/2003  | Choo ........................ 349/149 |
| 2004/0125060 | A1 | * | 7/2004  | Park et al. ................. 345/87 |
| 2005/0264507 | A1 | * | 12/2005 | Jang et al. .................. 345/87 |
| 2005/0269638 | A1 | * | 12/2005 | Jung et al. ................. 257/347 |
| 2006/0007085 | A1 | * | 1/2006  | Kim et al. ................... 345/87 |
| 2007/0040178 | A1 | * | 2/2007  | Chang et al. ............... 257/72 |

* cited by examiner

*Primary Examiner*—Mike Qi
(74) *Attorney, Agent, or Firm*—Morgan, Lewis & Bockius LLP

(57) ABSTRACT

A liquid crystal display panel having a built in driving circuit according to the present invention includes liquid crystal cells arranged in a matrix form in a display area of the panel and a driving circuit disposed outside the display area in a non-display area to drive the liquid crystal cells. The liquid crystal display panel also includes a plurality of LOG-type signal lines disposed at a LOG area within the non-display area to supply a plurality of signals to the driving circuit. In addition, the liquid crystal display panel includes a black matrix disposed in the non-display area excluding the LOG area so that the black matrix is absent in the LOG area.

19 Claims, 6 Drawing Sheets

DRIVING CIRCUIT BUILT-IN LIQUID CRYSTAL DISPLAY PANEL AND FABRICATING METHOD THEREOF

This application claims the benefit of Korean Patent Application No. P2004-39135 filed in Korea on May 31, 2004, which is hereby incorporated by reference.

BACKGROUND OF THE INVENTION

1. Field of the Invention

This invention relates to a liquid crystal display, and more particularly, to a driving circuit built-in liquid crystal display panel and a fabricating method thereof.

2. Description of the Related Art

Generally, a liquid crystal display (LCD) used as a display device, for example, in a television, a desktop monitor, a personal digital assistant (PDA) or a portable computer, controls light transmittance of liquid crystal using an electric field, thereby displaying a picture. To this end, the LCD includes a liquid crystal display panel having liquid crystal cells arranged in a matrix type and a driving circuit for driving the liquid crystal display panel.

As shown in FIG. 1, a related art LCD includes a liquid crystal display panel 13 having m×n liquid crystal cells Clc arranged in a matrix, m data lines D1 to Dm and n gate lines G1 to Gn intersecting each other, and thin film transistors TFT provided at intersections thereof. The LCD also includes a data driving circuit 11 for applying data signals to the data lines D1 to Dm of the liquid crystal display panel 13 and a gate driving circuit 12 for applying a scanning pulse to the gate lines G1 to Gn.

The liquid crystal display panel 13 is formed by joining a thin film transistor substrate provided with a thin film transistor array to a color filter substrate provided with a color filter array with a liquid crystal layer therebetween. The data lines D1 to Dm and the gate lines G1 to Gn provided at the thin film transistor substrate of the liquid crystal display panel 13 cross each other perpendicularly. The thin film transistor TFT provided at each intersection between the data lines D1 to Dm and the gate lines G1 to Gn applies a data voltage supplied via the corresponding data line to a pixel electrode of the liquid crystal cell Clc in response to a scanning pulse from the corresponding gate line. The color filter substrate is provided with such elements as a black matrix, a color filter, a common electrode, etc. The liquid crystal cell Clc rotates liquid crystal molecules having a dielectric anisotropy by a potential difference between a data voltage supplied to the pixel electrode and a common voltage supplied to the common electrode to thereby control light transmittance. A polarizer having a perpendicular light axis is attached onto the thin film transistor substrate and the color filter substrate of the liquid crystal display panel 13, and an alignment film for determining a free-tilt angle of the liquid crystal is further provided on the inner surface coming in touch with the liquid crystal layer. Further, each liquid crystal cell Clc is provided with a storage capacitor Cst. The storage capacitor Cst is provided between the pixel electrode and the pre-stage gate line or between the pixel electrode and a common line (not shown), thereby maintaining a data voltage charged in the liquid crystal cell Clc constant.

The data driving circuit 11 converts an input digital video data into an analog data voltage using a gamma voltage and applies the converted analog data voltage to the data lines D1 to Dm. The gate driving circuit 12 sequentially applies a scanning pulse to the gate lines G1 to Gn to thereby select a horizontal line of the liquid crystal cell Clc to be supplied with the data.

Such an LCD forms a thin film transistor TFT from a polycrystalline silicon or an amorphous silicon. The polycrystalline silicon has a relatively high charge mobility such that a driving circuit requiring a fast response speed can be built in the liquid crystal display panel. Recently, there has been highlighted a scheme in which the driving circuit can be built in the liquid crystal display panel even when an amorphous silicon is used.

As shown in FIG. 2, a gate driving circuit 20 having a relatively simple circuit configuration is built in a liquid crystal display panel 30 employing an amorphous silicon. The gate driving circuit 20 includes a shift register for sequentially applying a scanning pulse to the gate lines G1 to Gn of the display area 10. The shift register comprises 1st to n-th stages connected in a cascade as shown in FIG. 3. The first to n-th stages are commonly supplied with a clock signal CLK, along with a high-level driving voltage (not shown), and with a start pulse Vst or an output signal of the previous stage. The first stage outputs a scanning pulse to the first gate line GL1 in response to the start pulse Vst and the clock signal CLK. Further, the second to n-th stages sequentially outputs a scanning pulse to the second to n-th gate lines G2 to Gn, respectively, in response to an output signal of the previous stage and the clock signal CLK. At least two clock signals having different phases are used for the clock signal CLK.

A circuit area having the gate driving circuit 20 built in and a line on glass (LOG) area provided with a clock line CLKL for applying the clock signal CLK to the gate driving circuit 20 are located outside the display area 10, that is, in a non-display area. Thus, the circuit area and the LOG area overlap with a black matrix 32 provided at the non-display area of the color filter substrate.

However, as the black matrix 32 is formed from a metal such as chrome (Cr), a parasitic capacitance C is provided between the black matrix 32 and the clock line CLKL. Thus, the parasitic capacitance C of the clock line CLK, along with a line resistance R of the clock line CLKL, distorts the clock signal CLK and the scanning pulse from the gate driving circuit 20. As can be seen from FIG. 4, a scanning pulse applied to the nth gate line Gn is distorted due to the parasitic capacitance R and line resistance R of the clock line CLKL such that a rising time and a falling time of the scanning pulse are similar to a width (approximately 14 μs) of the clock signal CLK.

SUMMARY OF THE INVENTION

Accordingly, the present invention is directed to a driving circuit built-in liquid crystal display panel and a fabricating method thereof that substantially obviate at least one of problems due to limitations and disadvantages of the related art.

It is an object of the present invention to provide a driving circuit built-in liquid crystal display panel and a fabricating method thereof that reduces the parasitic capacitance in the LOG area, thereby reducing the distortion of the clock signal and the scanning pulse and reducing the rising and falling times of the scanning pulse.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve these and other objects of the invention, a liquid crystal display panel having a built in driving circuit includes liquid crystal cells arranged in a matrix form in a display area of the panel; a driving circuit disposed outside the display area in a non-display area to drive the liquid crystal cells; a plurality of LOG-type signal lines disposed at a LOG area within the non-display area to supply a plurality of signals to the driving circuit; and a black matrix disposed in the non-display area excluding the LOG area so that the black matrix is absent in the LOG area.

In another aspect of the present invention, a method of fabricating a liquid crystal display panel having a built in driving circuit, the method comprising the steps of: providing a thin film transistor substrate having a thin film transistor array including a gate line, a data line, a thin film transistor and a pixel electrode formed in a display area, a driving circuit formed in a non-display area, and a plurality of LOG-type signal lines formed in an LOG area of the non-display area for supplying a plurality of signals to the driving circuit; providing a color filter substrate having a color filter formed at the display area and a black matrix formed in the non-display area excluding the LOG area; and joining the thin film transistor substrate to the color filter substrate with a liquid crystal layer therebetween.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENT

Reference will now be made in detail to the preferred embodiments of the present invention, examples of which are illustrated in the accompanying drawings.

Figure 5:
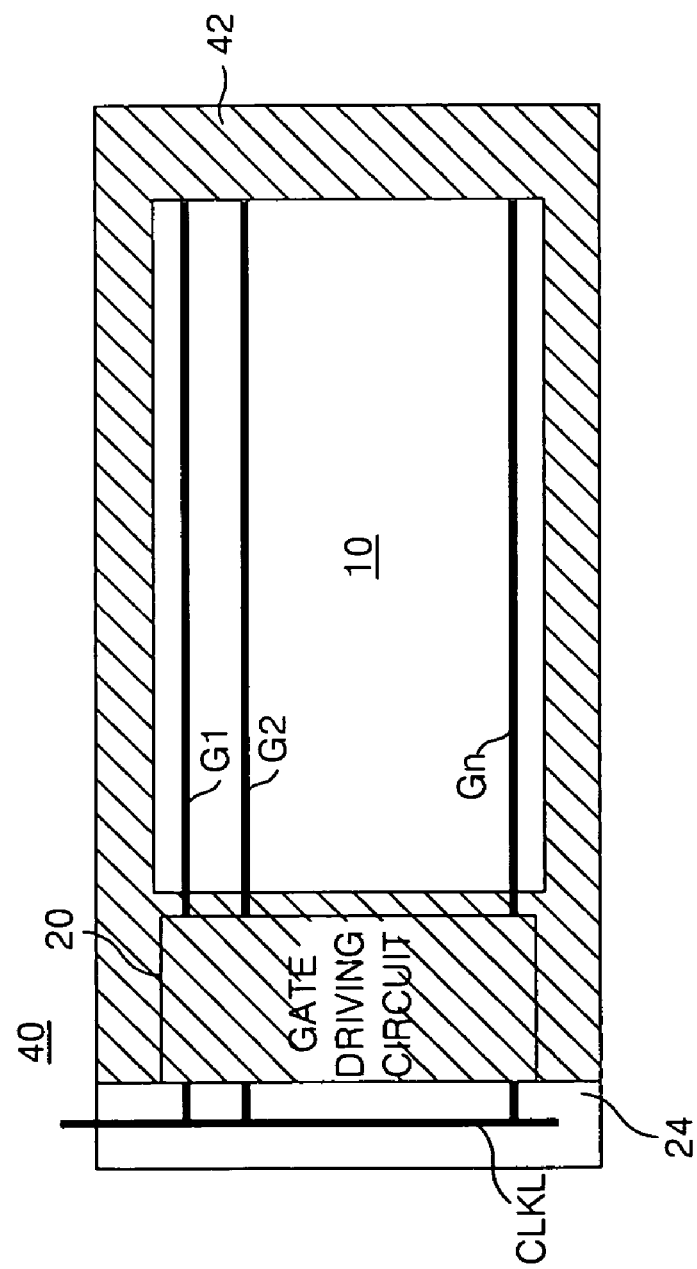
FIG. 5 is a schematic plan view of a liquid crystal display panel having a gate driving circuit built in according to an embodiment of the present invention.

FIG. 5 is a schematic plan view of a liquid crystal display panel 40 having a gate driving circuit 20 built in according to an embodiment of the present invention.

As shown in FIG. 5, the liquid crystal display panel 40 includes a display area 10 at which liquid crystal cells are provided for each pixel area defined by each intersection between gate lines G1 to Gn and data lines (not shown), and a gate driving circuit 20 built in a non-display area to drive the gate lines G1 to Gn. The liquid crystal display panel 40 is formed by joining a thin film transistor substrate provided with a thin film transistor array to a color filter substrate provided with a color filter array with a liquid crystal layer therebetween.

A display area of the thin film transistor substrate is provided with gate lines G1 to Gn and data lines intersecting each other, and a pixel electrode of the liquid crystal cell connected to the thin film transistor. A circuit area in the non-display area is provided with the gate driving circuit 20 for driving the gate lines G1 to Gn, and an LOG area 24 is provided with a clock line CLKL for applying a clock signal CLK required for the gate driving circuit 20. The clock line CLKL is comprised of a plurality of clock lines capable of supplying at least two clock signals having different phases. Further, the LOG area 24 is provided with a plurality of LOG-type signal lines (not shown) for supplying a gate high voltage VGH, a gate low voltage VGL, a gate output enable signal GOE, power signals VDD and VSS, and other signals required for the gate driving circuit 20. This LOG area 24 is placed to one side of the driving circuit 20. For instance, as shown in FIG. 5, the LOG area 24 is placed to the left side of the driving circuit. On the other hand, the LOG area 24 might be placed between the driving circuit 20 and the display area 10.

Figure 1:
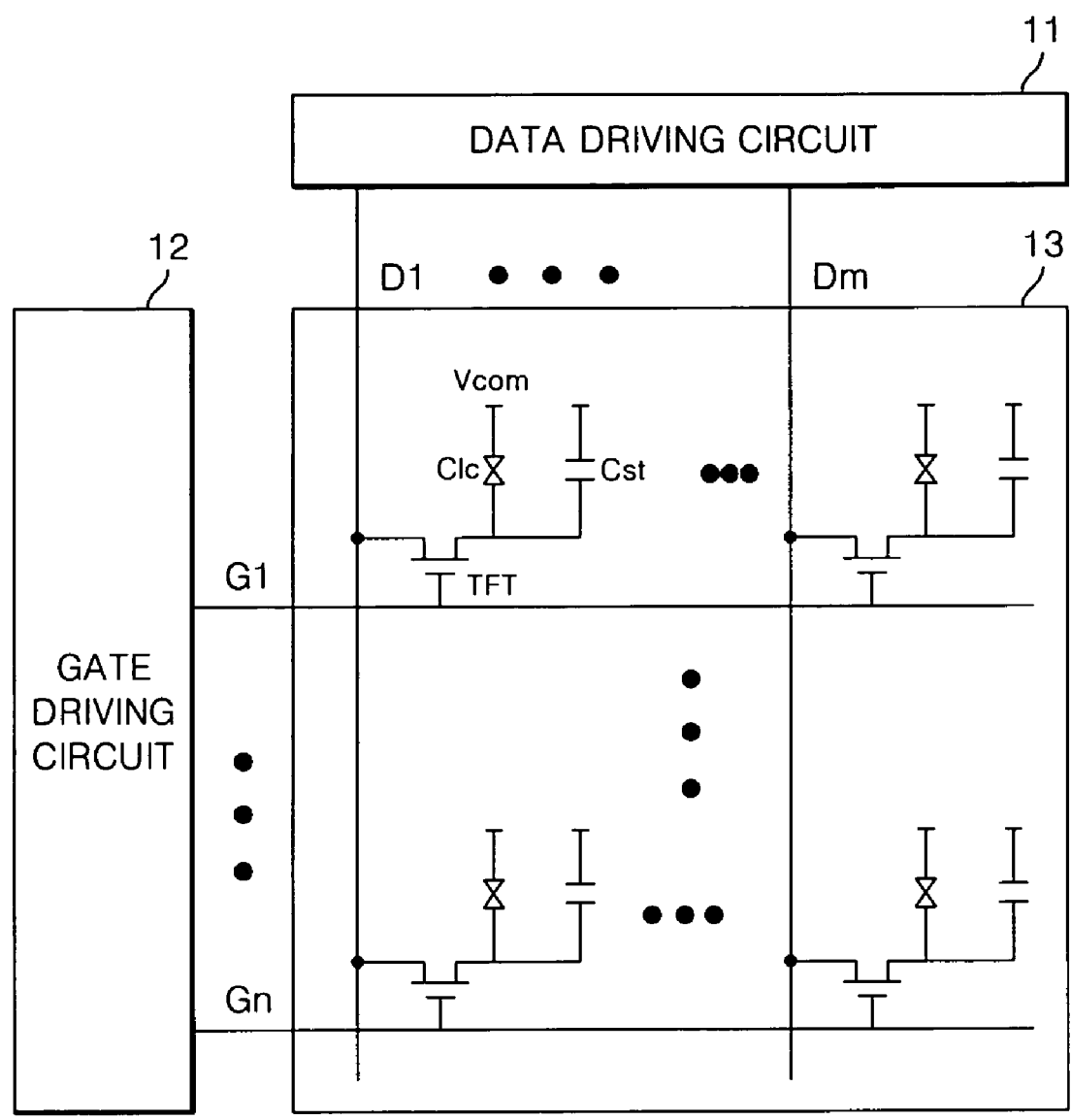
FIG. 1 is a block circuit diagram showing a configuration of a general liquid crystal display device.
Figure 2:
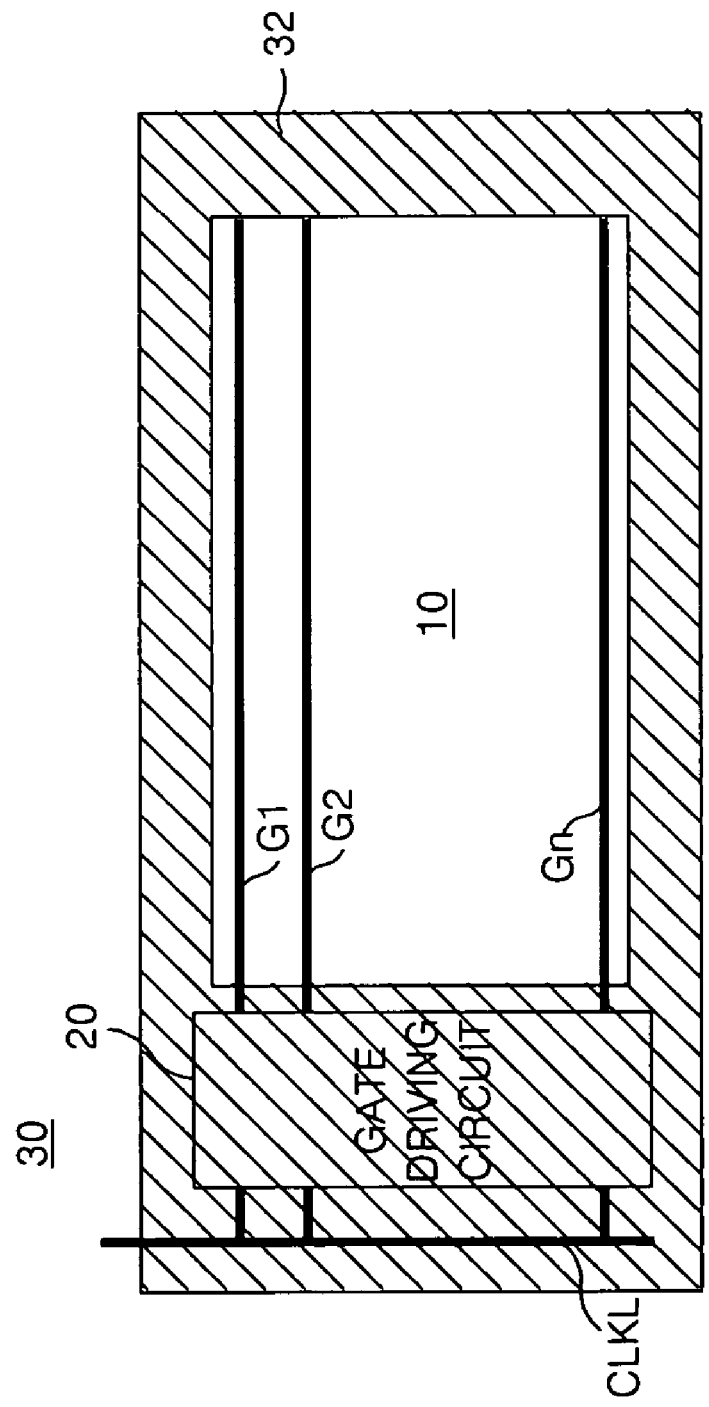
FIG. 2 is a schematic plan view of a related art liquid crystal display panel having a built in gate driving circuit.
Figure 3:
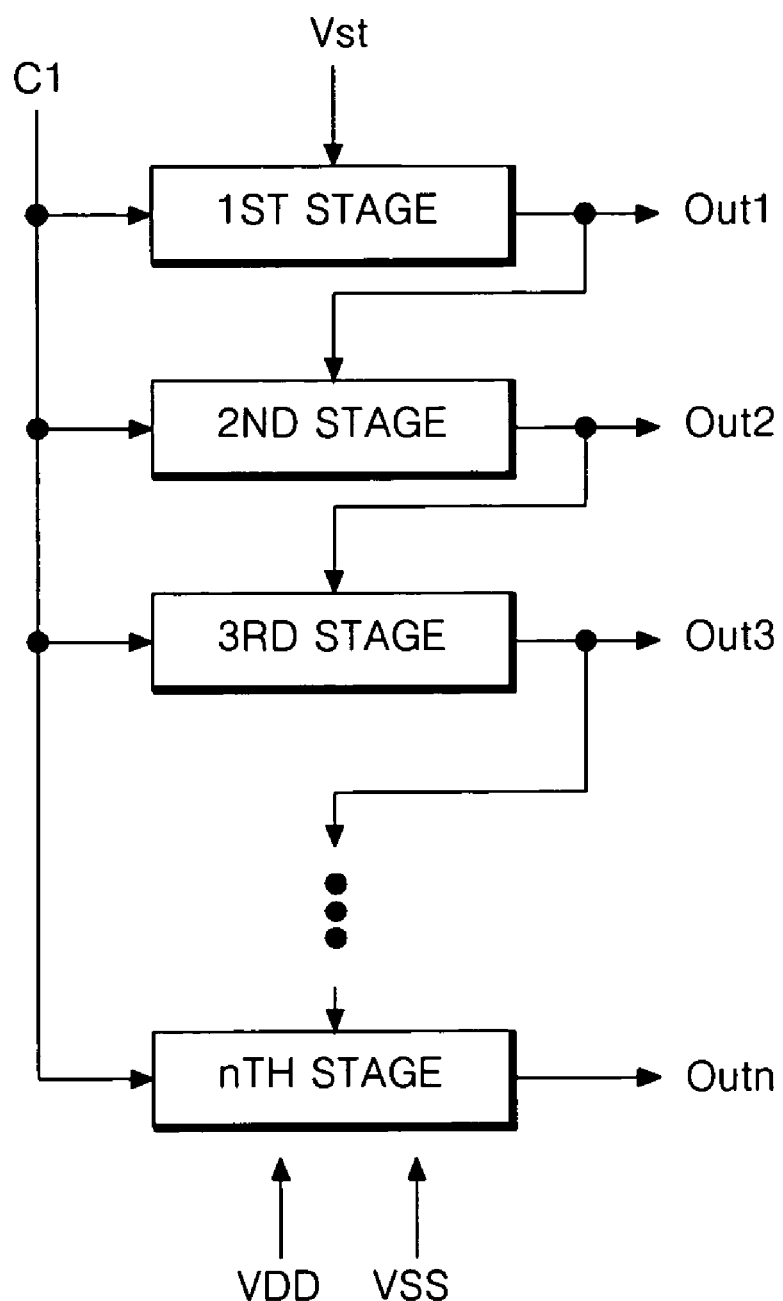
FIG. 3 is a detailed block diagram of the gate driving circuit shown in FIG. 2.
Figure 4:
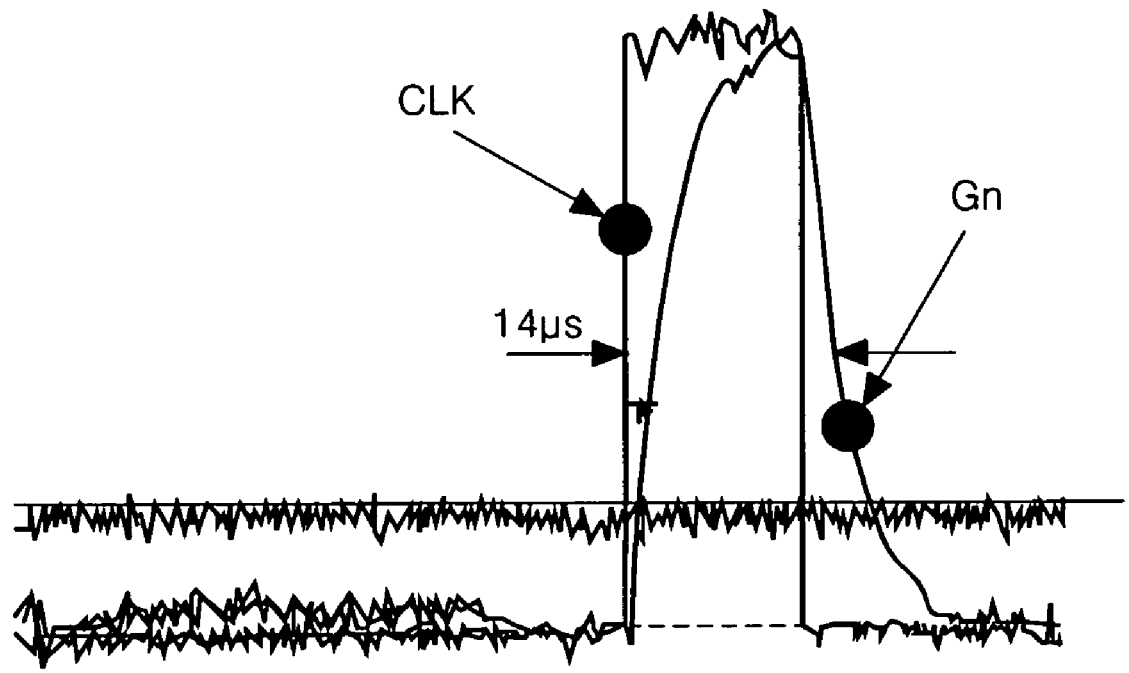
FIG. 4 illustrates waveforms of the clock signal CLK and a scanning supplied to the n-th gate line shown in FIG. 2.
Figure 6:
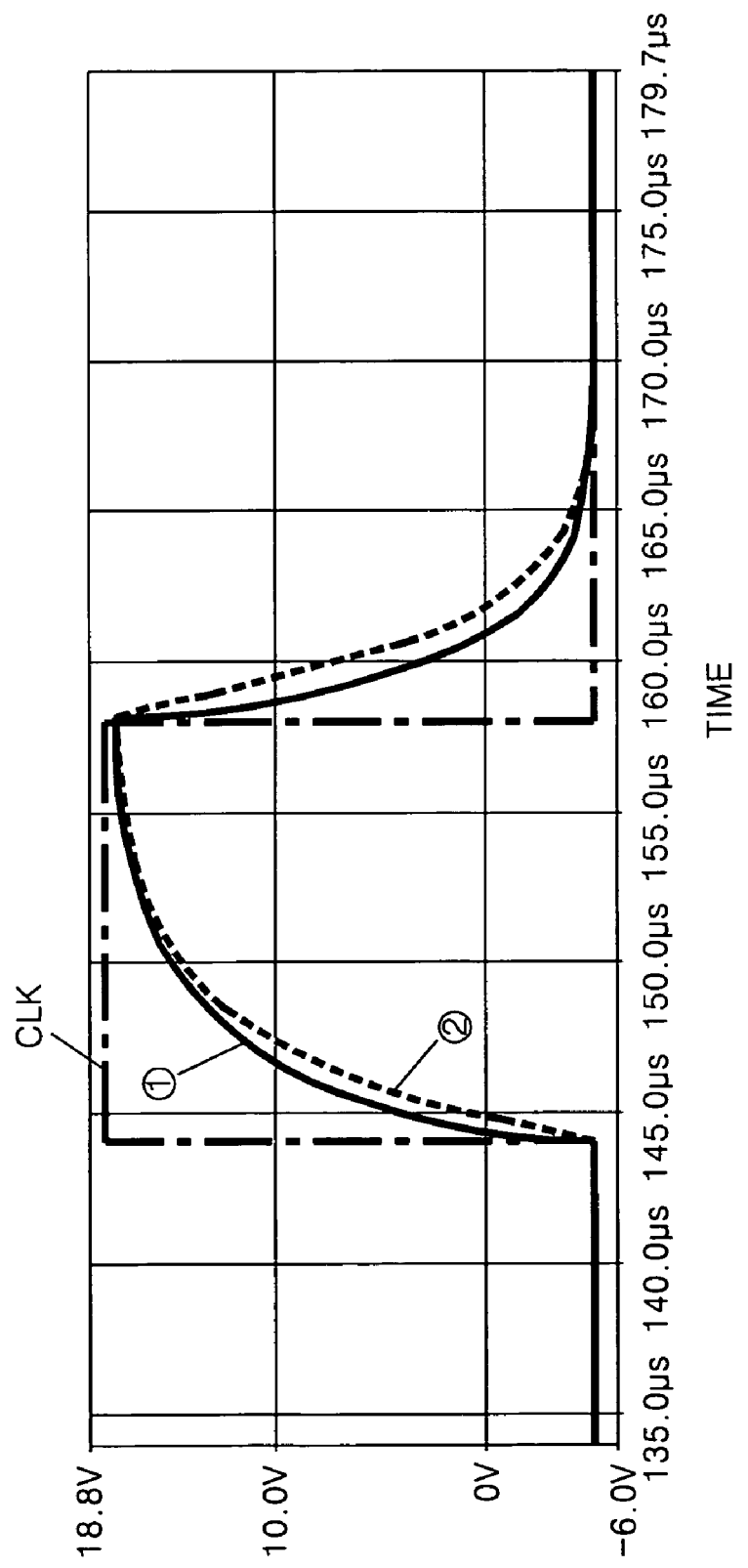
FIG. 6 illustrates a waveform of the scanning pulse supplied to the n-th gate line in the panel shown in FIG. 5 in comparison with a waveform of the scanning pulse supplied to the n-th gate line shown in FIG. 2.

The color filter substrate is provided with a color filter formed for each pixel area at the display area, a black matrix 42 provided to divide the color filters at the display area and also provided at the non-display area, and a common electrode for supplying a common voltage to the liquid crystal cell. Herein, the black matrix 42 is removed from the portion of the non-display area overlapping with the LOG area 24 provided with, among others, the clock line CLKL of the thin film transistor substrate. Thus, the black matrix 42 does not overlap with the LOG-type signal lines including the clock line CLKL, thereby preventing generation of parasitic capacitance and reducing the parasitic capacitance of the LOG-type signal lines. As a result, a distortion of the scanning pulse caused by the parasitic capacitance of the LOG-type signal lines can be minimized. It can be seen from FIG. 6 that a rising time and a falling time of the scanning pulse 1 supplied from the gate driving circuit 20 of the liquid crystal display panel 40 to the n-th gate line Gn shown in FIG. 5 are reduced in comparison with those of the scanning pulse 2 supplied to the n-th gate line Gn of the liquid crystal display panel 30 shown in FIG. 2.

The black matrix 42 removed at the portion overlapping with the LOG area 24 in this manner is provided by forming a metal layer or a black resin layer, such as chrome (Cr), on a glass substrate and then patterning it by the photolithography and etching process using a mask.

Furthermore, when a data driving circuit is built in the liquid crystal display panel 40, the black matrix can be removed at a second LOG area (not shown) provided with second LOG-type signal lines for supplying control signals required for the data driving circuit to thereby reduce the parasitic capacitance in the second LOG area. In this case, the second LOG-type signal lines supply, for example, a video data, a plurality of data control signals and a plurality of power signals required for the data driving circuit.

As described above, according to the present invention, the black matrix is removed at the LOG area to prevent a generation of parasitic capacitance between the black matrix and the signal lines in the LOG area. Accordingly, the parasitic capacitance on the LOG-type signal lines built in the liquid crystal display panel can be reduced, and hence, a signal distortion caused by the parasitic capacitance can be reduced.

It will be apparent to those skilled in the art that various modifications and variations can be made in the method and the apparatus for driving a liquid crystal display device of the present invention without departing from the sprit or scope of the invention. Thus, it is intended that the present invention covers the modifications and variations of this invention provided they come within the scope of the appended claims and their equivalents.

What is claimed is:

1. A liquid crystal display panel having a built in driving circuit, comprising:
   liquid crystal cells arranged in a matrix form in a display area of the panel;
   a driving circuit disposed outside the display area in a non-display area to drive the liquid crystal cells;
   a plurality of LOG-type signal lines disposed at a LOG area within the non-display area to supply a plurality of signals to the driving circuit; and
   a black matrix disposed in the non-display area excluding the LOG area so that the black matrix is absent in the LOG area.

2. The liquid crystal display panel according to claim 1, wherein the driving circuit includes at least one of a gate driving circuit for driving gate lines of the liquid crystal cells and a data driving circuit for driving data lines of the liquid crystal cells.

3. The liquid crystal display panel according to claim 2, wherein the LOG-type signal lines supply a plurality of gate control signals and a plurality of power signals to the gate driving circuit.

4. The liquid crystal display panel according to claim 2, wherein the LOG-type signal lines supply a video data, a plurality of data control signals and a plurality of power signals to the data driving circuit.

5. The liquid crystal display panel according to claim 1, wherein the thin film transistor built in the liquid crystal cells and the driving circuit includes a semiconductor layer employing an amorphous silicon.

6. The liquid crystal display panel according to claim 1, wherein the LOG area is placed to one side of the driving circuit.

7. The liquid crystal display panel of according to claim 1, wherein the LOG area is placed to one side of the driving circuit and the display area is placed to another side of the driving circuit.

8. The liquid crystal display panel of according to claim 1, wherein the LOG area is placed between the driving circuit and the display area.

9. A method of fabricating a liquid crystal display panel having a built in driving circuit, the method comprising the steps of:
   providing a thin film transistor substrate having a thin film transistor array including a gate line, a data line, a thin film transistor and a pixel electrode formed in a display area, a driving circuit formed in a non-display area, and a plurality of LOG-type signal lines formed in an LOG area of the non-display area for supplying a plurality of signals to the driving circuit;
   providing a color filter substrate having a color filter formed at the display area and a black matrix formed in the non-display area excluding the LOG area; and
   joining the thin film transistor substrate to the color filter substrate with a liquid crystal layer therebetween.

10. The method according to claim 9, wherein the thin film transistor substrate includes a semiconductor layer employing an amorphous silicon.

11. The method according to claim 9, wherein the driving circuit drives at least one of the data line and the gate line.

12. The method according to claim 11, wherein the LOG-type signal lines are formed to supply a plurality of gate control signals and a plurality of power signals to the driving circuit.

13. The method according to claim 11, wherein the LOG-type signal lines are formed to supply a video data, a plurality of data control signals and a plurality of power signals to the driving circuit.

14. The method according to claim 9, wherein the providing of the color filter substrate includes:
   forming a black matrix layer over a glass substrate,
   etching portions of the black matrix layer using a mask to form the black matrix, wherein the etched portions include the LOG area and parts of the display area.

15. The method according to claim 14, wherein the black matrix layer includes at least one of metal and black resin.

16. The method according to claim 14, wherein the black matrix layer includes chrome.

17. The method according to claim 9, wherein the LOG area is placed to one side of the driving circuit.

18. The method according to claim 9, wherein the LOG area is placed between the driving circuit and the display area.

19. The method according to claim 9, wherein the LOG area is placed to one side of the driving circuit and the display area is placed to another side of the driving circuit.

* * * * *